United States Patent
Ohba et al.

(10) Patent No.: US 6,728,523 B1
(45) Date of Patent: Apr. 27, 2004

(54) METHOD AND APPARATUS FOR STABILIZING FREQUENCY OF OUTPUT SIGNAL OF RELAY STATION IN RADIO COMMUNICATION SYSTEM

(75) Inventors: Takeshi Ohba, Kawasaki (JP); Atsushi Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 09/699,771

(22) Filed: Oct. 30, 2000

(30) Foreign Application Priority Data

Mar. 1, 2000 (JP) .......................... 2000-056465

(51) Int. Cl.[7] ................................. H04B 1/18
(52) U.S. Cl. ................. 455/182.2; 455/192.2; 455/196.1; 455/75
(58) Field of Search .............. 455/182.2, 192.2, 455/196.1, 260, 316, 7, 10, 75, 73, 265, 182.1, 314, 86, 87; 375/344

(56) References Cited

U.S. PATENT DOCUMENTS

| | | | |
|---|---|---|---|
| 5,388,125 A | * 2/1995 | Toda et al. | 455/192.2 |
| 5,423,076 A | * 6/1995 | Westergren et al. | 455/260 |
| 5,461,645 A | * 10/1995 | Ishii | 455/196.1 |
| 6,230,021 B1 | * 5/2001 | Ohdachi | 455/260 |
| 6,240,147 B1 | * 5/2001 | Muramatsu et al. | 375/344 |

FOREIGN PATENT DOCUMENTS

JP 4-57416 2/1992

* cited by examiner

*Primary Examiner*—Nay Maung
*Assistant Examiner*—John J Lee
(74) *Attorney, Agent, or Firm*—Katten Muchin Zavis Rosenman (57) ABSTRACT

A method of stabilizing frequency of an output signal of a data-relay apparatus provided in a radio communication system that includes a relay station and a radio terminal device, wherein the data-relay apparatus receives a signal as an input signal from the relay station, and transmits the signal as an output signal to the radio terminal device. The method includes the steps of demodulating the output signal to generate a demodulated signal by use of a first signal, detecting frequency deviation of the output signal from the demodulated signal, generating the first signal according to the detected frequency deviation of the output signal, and generating a second signal to mix with the input signal to generate the output signal according to the generation of the first signal and the second signal being carried out such that the detected frequency deviation of the output signal becomes substantially zero.

14 Claims, 8 Drawing Sheets

METHOD AND APPARATUS FOR STABILIZING FREQUENCY OF OUTPUT SIGNAL OF RELAY STATION IN RADIO COMMUNICATION SYSTEM

BACKGROUND OF THE INVENTION

1. Field of the Invention

The present invention relates to a method and an apparatus for stabilizing frequency of a signal outputted from a relay station in a communication system, an more particularly to a method and an apparatus for stabilizing frequency of a signal outputted from a relay station in a telecommunication system and in a broadcasting system by use of a satellite.

2. Description of the Related Art

A telecommunication system that performs digital communication for mobile terminal devices and a broadcasting system that broadcasts programs for digital television by use of a relay station located at a high altitude such as a communication satellite or a balloon in the stratosphere have been suggested recently.

Figure 1:
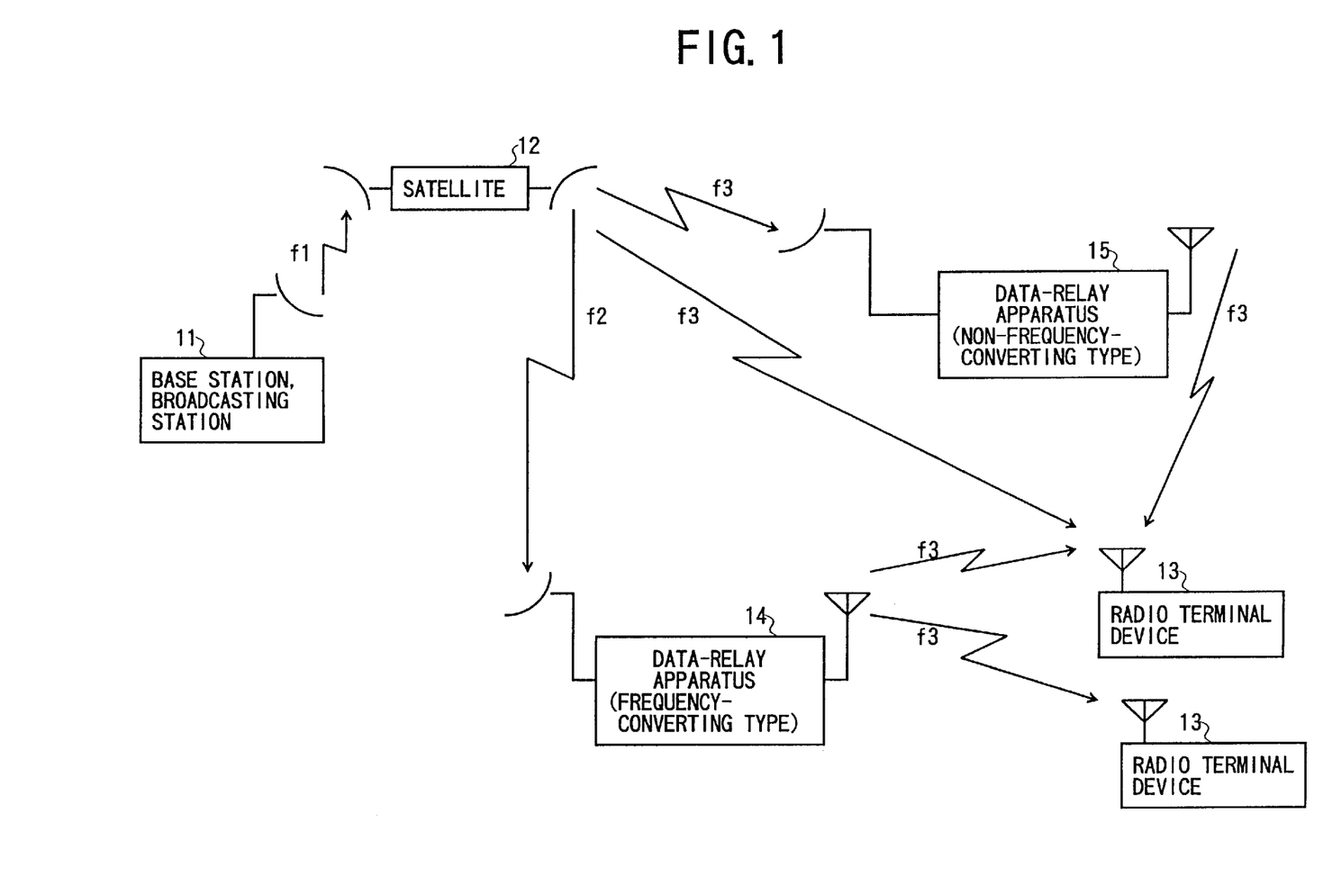
FIG. 1 is a block diagram showing a communication system using a communication satellite for digital communication between a base station and a radio terminal device.

FIG. 1 is a block diagram showing a radio communication system using a communication satellite for digital communication between a base station and a radio terminal device. The radio communication system shown in FIG. 1 includes a base station 11, a relay station 12, a radio terminal device 13, and data-relay apparatuses 14 and 15.

The base station initially 11 modulates communication information, and transmits a code-division-multiplexed signal having a frequency f1 to the relay station 12 such as a communication satellite. The relay station 12 coverts the signal having the frequency f1 received from the base station 11 to a signal having a frequency f2 and a signal having a frequency f3, and transmits those signals in a code-division-multiplex format to earth stations.

The radio terminal device 13 receives the signal having the frequency f3 from the relay station 12, and demodulates the communication information included therein. The data-relay apparatus 14 receives the signal having the frequency f2 from the relay station 12, and converts the received signal to a code-division-multiplexed signal having the frequency f3, then transmitting the converted signal to other devices such as the radio terminal device 13. The data-relay apparatus 14 amplifies the received signal if necessary. The data-relay apparatus 15 receives the signal having the frequency f3 from the relay station 12, and amplifies the received signal in addition to attending to other signal processing, followed by transmitting the processed signal to other devices without converting the frequency of the received signal.

Accordingly, the radio terminal device 13 can receive the signal having the frequency f3 from the relay station 12 through the apparatuses 14 and 15 even if the radio terminal device 13 is located in a blind zone. The above-described system may also be applied to digital-television broadcasting. In this case, the system substitutes a broadcasting station for the base station 11. Additionally, a broadcasting satellite is used as the relay station 12.

Figure 2:
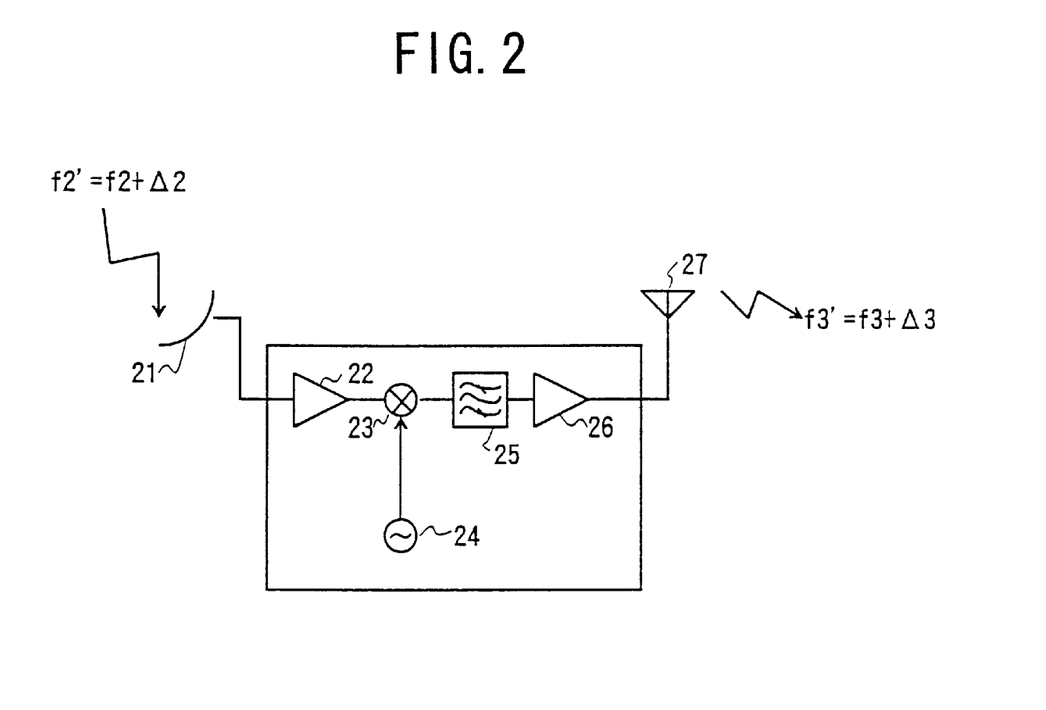
FIG. 2 is a block diagram showing a conventional data-relay apparatus that relays a received signal to other devices after converting frequency of the received signal to another frequency.

FIG. 2 is a block diagram showing a conventional data-relay apparatus 14 that converts frequency of a signal to another frequency, and transmits the signal to other devices. It should be noted that the above-described conventional data-relay apparatus 14 is, hereinafter, referred to as a conventional frequency-converting-data-relay apparatus 14.

The conventional frequency-converting-data-relay apparatus 14 includes a data-receiving antenna 21, an amplifier 22, a mixer 23, a generator 24, a band-pass filter 25, an amplifier 26 and a data-transmitting antenna 27. In FIG. 2, frequency f2' is the frequency f2 with an error Δf2. Similarly, frequency f3' is the frequency f3 with an error Δf3.

The conventional frequency-converting-data-relay apparatus 14 initially receives a signal having the frequency f2' from the data-receiving antenna 21, and amplifies the signal by use of the amplifier 22. Subsequently, the conventional frequency-converting-data-relay apparatus 14 converts the frequency f2' of the signal amplified by the amplifier 22 to the frequency f3' by mixing the signal amplified by the amplifier 22 with a signal generated by the generator 24 by use of the mixer 23. The frequency f3' includes the error Δf3 of the frequency f3 that is caused by the error Δf2 of the frequency f2 and performance of the generator 24.

The conventional frequency-converting-data-relay apparatus 14 then filters the frequency f3' of the signal by use of the band-pass filter 25. Additionally, the conventional frequency-converting-data-relay apparatus 14 amplifies the signal by use of the amplifier 26, and then outputs the signal having the frequency f3' from the data-transmitting antenna 27.

Figure 3:
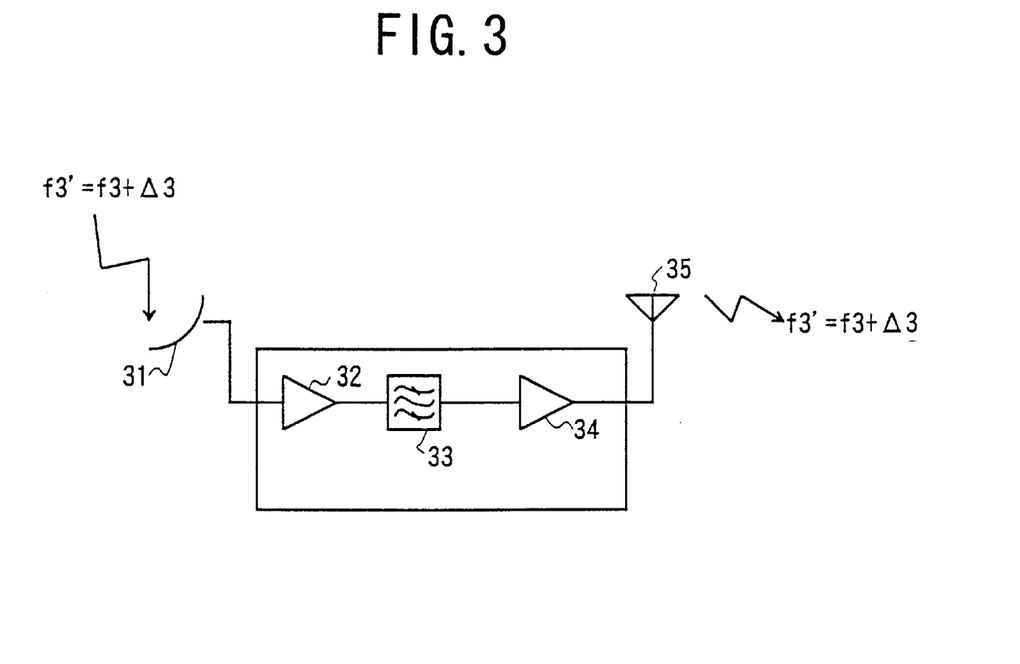
FIG. 3 is a block diagram showing a conventional data-relay apparatus that relays a received signal to other devices without converting frequency of the received signal to another frequency.

FIG. 3 is a block diagram showing a conventional data-relay apparatus 15 that transmits the signal to other devices without converting frequency of a signal to another frequency. The above-described conventional data-relay apparatus 15 includes a data-receiving antenna 31, an amplifier 32, a band-pass filter 33, an amplifier 34 and a data-transmitting antenna 35.

The conventional data-relay apparatus 15 initially receives a signal having the frequency f3' from the data-receiving antenna 31, and amplifies the signal by use of the amplifier 32. The conventional data-relay apparatus 15 then filters the frequency f3' of the signal by use of the band-pass filter 33. Additionally, The conventional data-relay apparatus 15 amplifies the signal by use of the amplifier 34, and then outputs the signal having the frequency f3' from the data-transmitting antenna 35.

In the communication system described with reference to FIG. 1, frequency deviation occurs in a signal received by the radio terminal device 13 according to performance of generators provided in the base station 11, the relay station 12 such as a satellite, and the data-relay apparatuses 14 and 15. Additionally, the frequency of the signal received by the radio terminal device 13 is shifted by the Doppler shift that is caused by movement of the radio terminal device 13 and speed of the satellite relative to the earth.

Additionally, when the radio terminal device 13 simultaneously receives a code-division-multiplexed signal having the frequency f3 from the relay station 12 and the signal having the frequency f3' from the data-relay apparatuses 14 and 15, the radio terminal device 13 cannot receive the signal effectively if the frequency deviation of the signals outputted from the data-relay apparatuses 14 and 15 is large. Consequently, quality of the signal received by the radio terminal device 13 decreases.

In order to solve the above-described problems, the radio terminal device 13 may include functions to search frequency of the received signal and execute an automatic frequency control (AFC) on the frequency, thereby reducing the frequency deviation of the received signal before demodulating the received signal. However, the number of the radio terminal devices 13 in the above-described communication system is very large, especially in the broadcasting system. Thus, it is necessary to minimize production cost of the radio terminal device 13. If the radio terminal device 13 is to execute a frequency search and the AFC, a circuit arrangement of the device 13 becomes complex, and the circuit scale becomes large. As a result, the production cost of the radio terminal device 13 increases.

SUMMARY OF THE INVENTION

Accordingly, it is a general object of the present invention to provide a method and an apparatus for stabilizing frequency of an output signal of a data-relay apparatus by minimizing frequency deviation of the output signal, thereby minimizing the size of a radio terminal device that receives the output signal from the data-relay apparatus.

The above-described objects of the present invention is achieved by a method of stabilizing frequency of an output signal of a data-relay apparatus provided in a radio communication system that includes a relay station and a radio terminal device, wherein the data-relay apparatus receives a signal as an input signal from the relay station, and transmits the signal as an output signal to the radio terminal device, the method including the steps of demodulating the output signal by use of a first signal to generate a demodulated signal, detecting frequency deviation of the output signal from the demodulated signal, generating the first signal according to the frequency deviation of the output signal, and generating a second signal to mix with the input signal to generate the output signal, the generation of the first signal and the second signal being carried out such that the detected frequency deviation of the output signal becomes substantially zero.

Accordingly, the data-relay apparatus stabilizes frequency of a signal inputted thereto, and transmits the signal having the stabilized frequency to the radio terminal device in the communication system, and thus the radio terminal device does not need to execute a frequency search and AFC control so that circuit structure of the radio terminal device can be simplified and its production cost can decrease.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

In a communication or broadcasting system using a satellite such as a geostationary satellite, as shown in FIG. 1 wherein a code division multiplex (CDM) is adopted to, a base station 11 or a broadcasting station 11 transmits various information for telecommunication or for broadcasting as a signal having a frequency f1 to a relay station 12 such as a satellite, after separating the information and modulating the separated information digitally by using a phase shift keying (PSK), for example. The relay station 12 coverts the signal having the frequency f1 received from the base station 11 or the broadcasting station 11 to the signal having a frequency f2 and the signal having a frequency f3. The frequency f2 and the frequency f3 are respectively set to 12 GHz and 2.6 GHz, for instance.

A radio terminal device 13 receives the signal having the frequency f3 from the relay station 12, and demodulates the information for the communication or for the broadcasting. A data-relay apparatus 14, as a relay station, receives the signal having the frequency f2 from the relay station 12, and converts the signal having the frequency f2 to the signal having the frequency f3 therein, followed by transmitting the converted signal to the radio terminal device 13. If amplification of the signal received from the relay station 12 is necessary, the data-relay apparatus 14 amplifies the received signal, and then transmits the amplified signal therefrom. A data-relay apparatus 15 receives the signal having the frequency f3 from the relay station 12, and amplifies the received signal, followed by transmitting the amplified signal therefrom to the radio terminal device 13.

Figure 4:
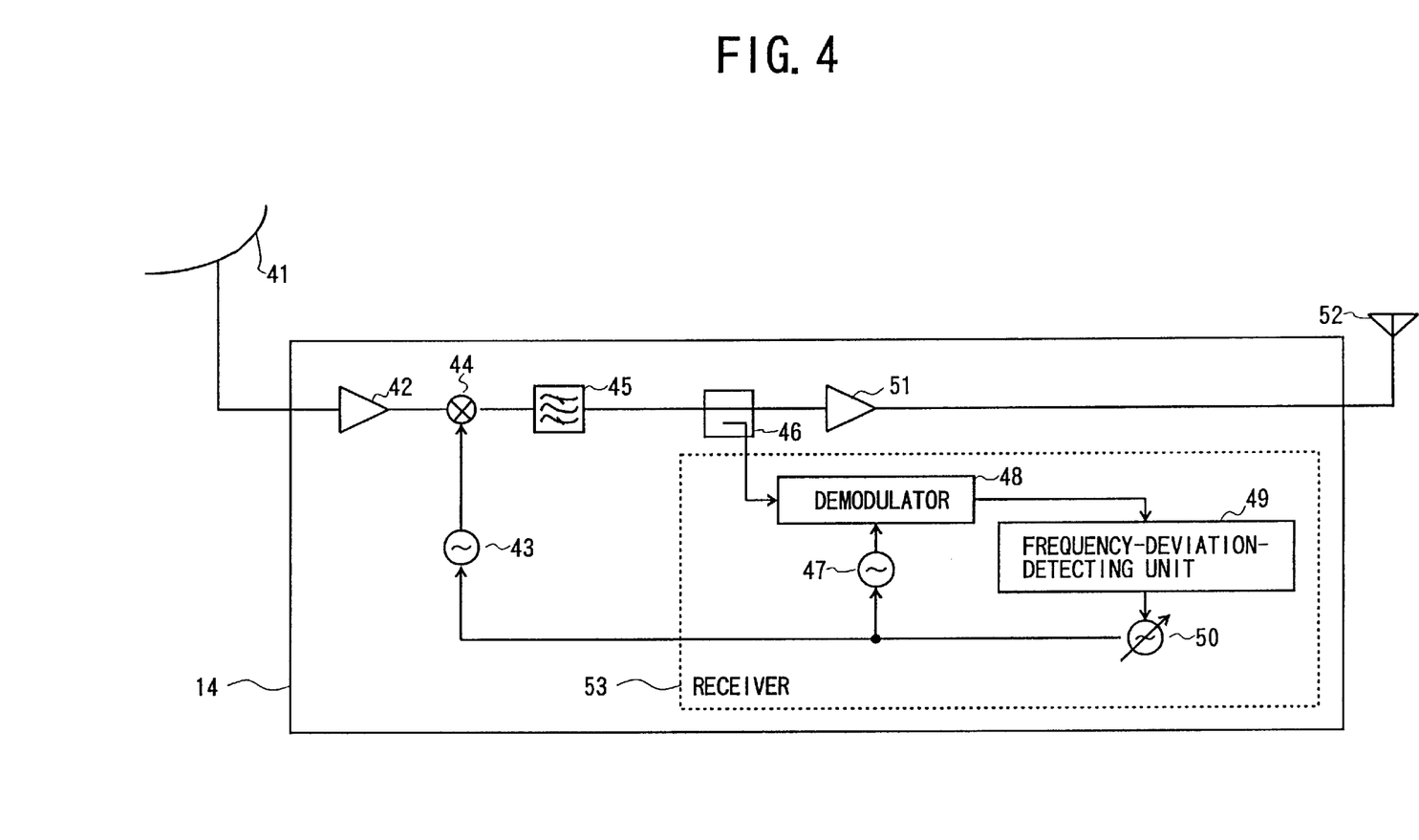
FIG. 4 is a block diagram showing a data-relay apparatus 14 that relays a received signal to other devices after converting frequency of the received signal to another frequency, according to a first embodiment of the present invention.

FIG. 4 is a block diagram showing the data-relay apparatus 14 that relays a signal received from the relay station 12 to other devices such as the radio terminal device 13 after converting frequency of the received signal to another frequency, according to a first embodiment of the present invention.

The data-relay apparatus 14 includes a data-receiving antenna 41, an amplifier 42, a generator 43, a mixer 44, a band-pass filter 45, a splitter 46, a generator 47, a demodulator 48, a frequency-deviation-detecting unit 49, a voltage-controlled oscillator 50, an amplifier 51 and a data-transmitting antenna 52. The generator 47, the demodulator 48, the frequency-deviation-detecting unit 49 and the voltage-controlled oscillator 50 together compose a receiver 53. The generators 43 and 47, a combination of the generator 43 and the mixer 44, the demodulator 48 and the frequency-deviation-detecting unit 49 correspond respectively to frequency-multiplication units, a frequency-conversion unit, a demodulation unit and a control unit in the claims.

The data-relay apparatus 14 initially receives a signal having the frequency f2 from the data-receiving antenna 41, and supplies the signal to the amplifier 42, where the signal is amplified. The device 14 then supplies the signal from the amplifier 42 to the mixer 44. The mixer 44 mixes the signal having the frequency f2 and a signal having a frequency fs1 generated by the generator 43, and outputs the signal having a frequency approximately equal to the frequency f3 (f3= f2-fs1). This frequency approximately equal to the frequency f3 is referred to as a frequency f3'. Subsequently, the data-relay apparatus 14 removes unnecessary parts of the frequency f3' by filtering the signal through the band-pass filter 45. The device 14 then supplies the signal having the frequency f3' to the splitter 46, where the signal is supplied to the amplifier 51 and the demodulator 48. The device 14 amplifies the signal having the frequency f3' by use of the amplifier 51, and outputs the amplified signal from the data-transmitting antenna 52 to other devices such as the radio terminal device 13.

The receiver 53 carries out AFC control as described below. The demodulator 48 receives the signal having the frequency f3' from the splitter 46, and demodulates the signal to a base-band signal by use of a signal generated by the generator 47. The base-band signal is then supplied to the frequency-deviation-detecting unit 49. Subsequently, the frequency-deviation-detecting unit 49 detects frequency deviation of the base-band signal, and transmits a detection signal notifying of the detected frequency deviation. A frequency fvco generated by the voltage-controlled oscillator 50 is altered according to the value of the detection signal supplied from the frequency-deviation-detecting unit 49.

Additionally, the voltage-controlled oscillator 50 supplies a signal having the frequency fvco to the generators 43 and 47. The generator 47 generates a signal having a frequency fs2, and supplies the signal to the demodulator 48 such that the frequency deviation of the signal detected by the frequency-deviation-detecting unit 49 is removed by the AFC control. The generator 43 outputs a signal having the frequency fs1 to the mixer 44 so that the frequency f2 is mixed with the frequency fs1 for converting the frequency f2 to the frequency f3'. The frequency fs1 is controlled by the receiver 53, and more particularly by the voltage-controlled oscillator 50 so that the frequency f3' becomes close to the frequency f3.

Figure 5:
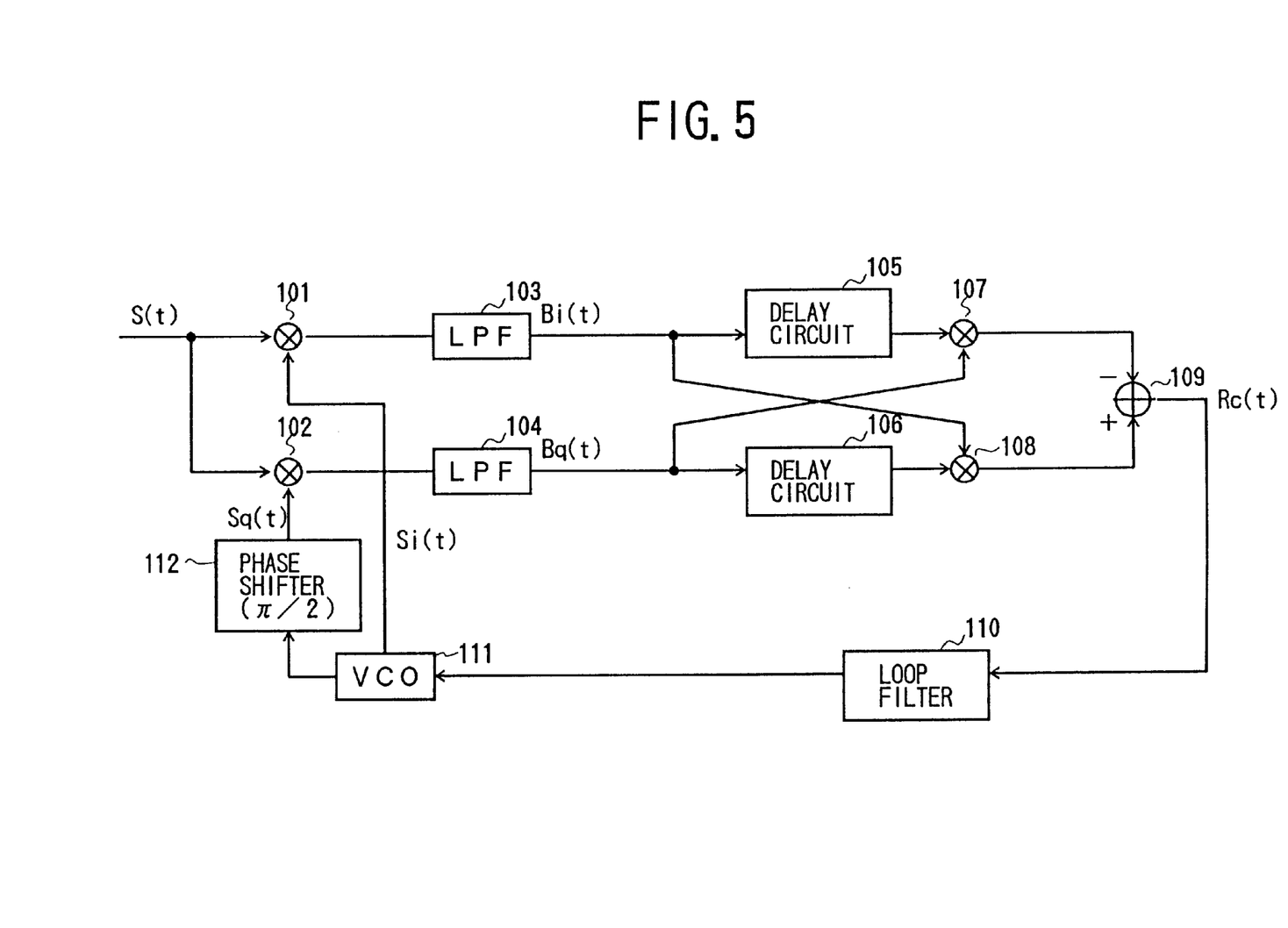
FIG. 5 is a block diagram showing an embodiment of a frequency-deviation-detecting unit 49 provided in the data-relay apparatus 14.

FIG. 5 is a block diagram showing an embodiment of the frequency-deviation-detecting unit 49, whereto a cross-product AFC circuit is adopted. The frequency-deviation-detecting unit 49 includes orthogonal detectors 101 and 102, low-pass filters (LPF) 103 and 104, delay circuits 105 and 106, multipliers 107 and 108, a subtractor 109, a loop filter 10, a voltage-controlled oscillator (VCO) 111 and a phase shifter 112.

The orthogonal detectors 101 and 102 initially receive the base-band signal as a signal S(t) from the demodulator 48. The orthogonal detector 101 is supplied additionally with a signal Si(t) generated by the voltage-controlled oscillator 111. The orthogonal detector 102 is supplied additionally with a signal Sq(t) that is the signal Si(t) with its phase being shifted by $\pi/2$ by the phase shifter 112. The orthogonal detector 101 multiplies the signal S(t) and the signal Si(t), executes orthogonal detection of the multiplied signal and then supplies the detected signal to the low-pass filters 103. Similarly, The orthogonal detector 102 multiplies the signal S(t) and the signal Sq(t), executes orthogonal detection of the multiplied signal, and then supplies the detected signal to the low-pass filters 104.

The low-pass filter 103 eliminates unnecessary parts of the frequency Si(t) supplied from the orthogonal detector 101, in other words, cuts off a high frequency part of the frequency Si(t), and supplies the signal as a signal Bi(t) to the multiplier 108 and the delay circuit 105. The delay circuit 105 holds the signal Bi(t) for a certain period τ, and then supplies the signal Bi(t) to the multiplier 107. The low-pass filter 104 eliminates unnecessary parts of the frequency Sq(t) supplied from the orthogonal detector 102, in other words, cuts off a high frequency part of the frequency Sq(t), and supplies the signal as a signal Bq(t) to the multiplier 107 and the delay circuit 106. The delay circuit 106 holds the signal Bq(t) for the certain period τ, and then supplies the signal Bi(t) to the multiplier 108.

The multiplier 107 multiplies the delayed signal Bi(t) from the delay circuit 105 and the signal Bq(t) from the low-pass filter 104, and then supplies the result to the subtractor 109. Similarly, the multiplier 108 multiplies the signal Bi(t) from the low-pass filter 103 and the delayed signal Bq(t) from the delay circuit 106, and then supplies the result to the subtractor 109. Subsequently, the subtractor 109 subtracts the signal that is supplied from the multiplier 107, from the signal that is supplied from the multiplier 108, and outputs the result as a frequency-discriminated signal Rc(t) to the loop filter 110. The loop filter 110 extracts a low part of the signal Rc(t) as error voltage, and supplies the error voltage to the voltage-controlled oscillator 111. The voltage-controlled oscillator 111 changes the value of the frequency of the signal Si(t) according to the value of the supplied error voltage. As previously described, the signal Si(t) is then supplied to the orthogonal detector 101 and the phase shifter 112.

The signal S(t) supplied to the orthogonal detectors 101 and 102 is expressed as:

$S(t) = \cos(\omega_0 t + \theta)$

The signal Si(t) supplied to the orthogonal detector 101 is expressed as:

$Si(t) = \cos\omega_1 t$

Additionally, the signal Sq(t) supplied to the orthogonal detector 102 is expressed as:

$Sq(t) = -\sin\omega_1 t$

It should be noted that "$\omega_0$" is carrier frequency of the signal S(t), "$\theta$" is a modulation element of the signal S(t), and "$\omega_1$" is freerunning frequency generated by the voltage-controlled oscillator 111. Accordingly, the signal Bi(t) and the signal Bq(t) are expressed as:

$Bi(t) = \cos(\Delta\omega t + \theta)/2$ $Bq(t) = \sin(\Delta\omega t + \theta)/2$ It should be noted that $\Delta\omega = \omega_0 - \omega_1 = 2\pi\Delta f$. Consequently, the frequency-discriminated signal Rc(τ) is obtained as:

$$Rc(\tau) = Bi(t) \times Bq(t+\tau) - Bq(t) \times Bi(t+\tau)$$
$$= \sin(\Delta\omega t)/4$$
$$= \sin(2\pi\Delta f \tau)/4$$

Figure 6:
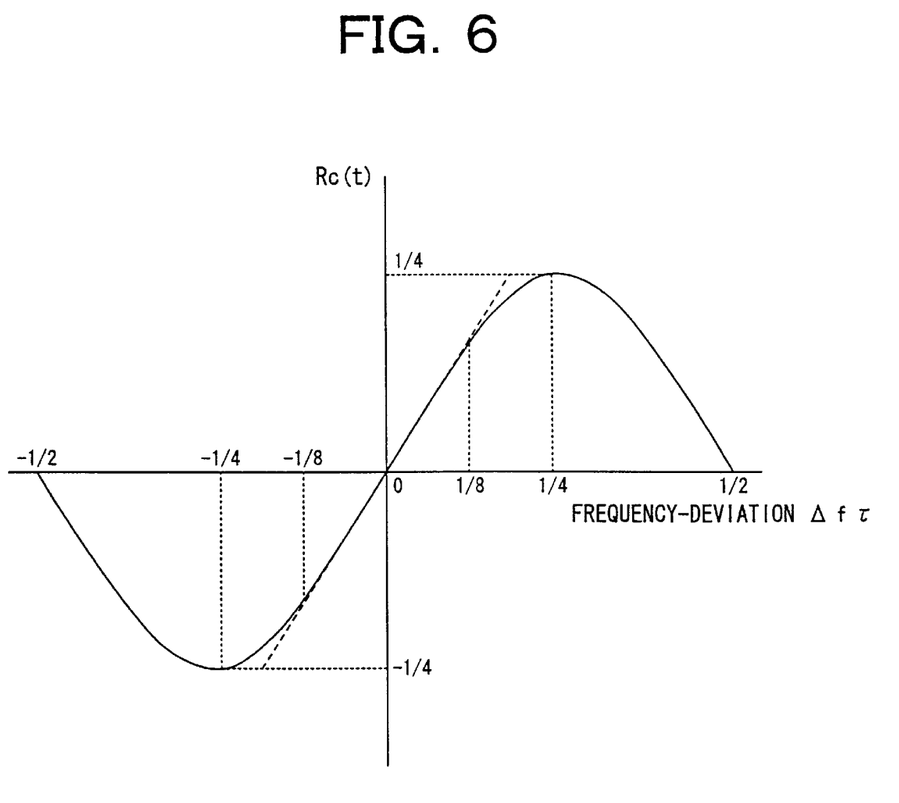
FIG. 6 is a graph showing characteristic of frequency discrimination.

It is ascertained from the above equation that an output of the cross-product AFC circuit, that is, the frequency-discriminated signal Rc(τ), is a function of frequency deviation. FIG. 6 shows characteristic of frequency discrimination. As seen from FIG. 6, when the value of frequency error Δfτ is between −1/4 and 1/4, Δf can be set to "0" by altering frequency generated by the voltage-controlled oscillator 111, by amount of the frequency-discriminated signal Rc(τ). Additionally, the signal outputted from the loop filter 110 is supplied to the voltage-controlled oscillator 50 in the receiver 53.

A description will now be given of equations to obtain frequency deviation of a signal transmitted by the data-relay apparatus 14. The frequency of a signal received by the data-receiving antenna 41, the frequency of the signal transmitted by the data-transmitting antenna 52, the output frequency of the generator 43, the output frequency of the generator 47 and the output frequency of the voltage-controlled oscillator 50 are respectively expressed as f2+Δf2, f3+Δf3, fs1+Δs1, fs2+Δs2 and fvco+Δvco. It should be noted that "Δ" means frequency deviation. Frequency deviation ΔBB of the base-band signal is derived from the following equations:

$$\Delta BB=(f2+\Delta f2)-(fs1+\Delta s1)-(fs2+\Delta s2)$$

The output frequency of the generator 43 is obtained by multiplying the output frequency of the voltage-controlled oscillator 50 by (f2–f3)/fvco. The output frequency of the generator 43 is then expressed as:

$$fs1+\Delta s1=(f2-f3)\times(fvco+\Delta vco)/fvco$$

Similarly, the output frequency of the generator 47 is obtained by multiplying the output frequency of the voltage-controlled oscillator 50 by f3/fvco. The output frequency of the generator 47 is then expressed as:

$$fs2+\Delta s2=f3\times(fvco+\Delta vco)/fvco$$

Accordingly, the frequency deviation ΔBB of the base-band signal is expressed as:

$$\begin{aligned}\Delta BB &= (f2+\Delta f2)-(fs1+\Delta s1)-(fs2+\Delta s2)\\&=(f2+\Delta f2)-(f2-f3)\times(fvco+\Delta vco)/fvco-f3\times\\&\quad(fvco+\Delta vco)/fvco\\&=\Delta f2-f2\times\Delta vco/fvco\end{aligned}$$

The value of ΔBB becomes "0" by the above-described AFC circuit so that Δvco is expressed as:

$$\Delta vco=fvco\times\Delta f2/f2$$

Accordingly, the frequency f3+Δf3 of the signal transmitted by the data-transmitting antenna 52 is expressed as:

$$\begin{aligned}f3+\Delta f3 &= (f2+\Delta f2)-(fs1+\Delta s1)\\&=(f2+\Delta f2)-(f2-f3)\times(fvco+\Delta vco)/fvco\\&=(f2+\Delta f2)-(f2-f3)/fvco\times(fvco+\Delta fvco\times\\&\quad\Delta f2/f2)\\&=(f2+\Delta f2)-(f2-f3)-(f2-f3)\times\Delta f2/f2\\&=f3+f3\times\Delta f2/f2\end{aligned}$$

Consequently, the frequency deviation Δf3 of the signal transmitted from the data-relay apparatus 14 is expressed as:

$$\Delta f3=f3\times\Delta f2/f2$$

As described above, the frequency deviation Δs1 of the generator 43 does not affect the frequency deviation Δf3.

Additionally the frequency f2 of a signal transmitted from the relay station 12 in FIG. 1 is generally set higher than the frequency f3 of the signal transmitted from the data-relay apparatus 14. For instance, the frequencies f2 and f3 are respectively set to 12 GHz and 2.6 GHz, and thus the frequency deviation Δf3 of the output signal can be set to a value comparatively smaller than the frequency deviation Δf2 of the input signal at the data-relay apparatus 14.

Figure 7:
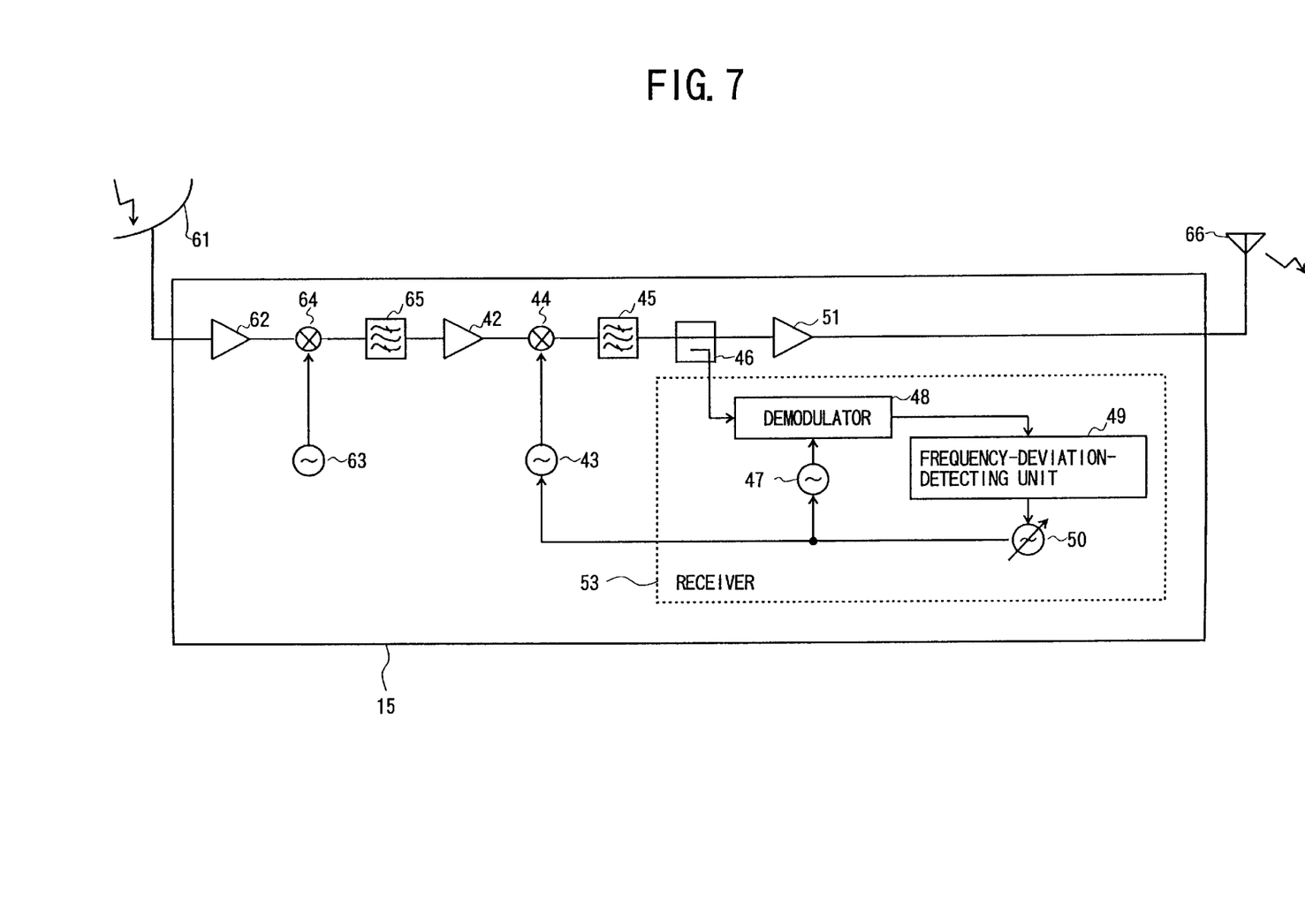
FIG. 7 is a data-relay apparatus 15 that relays a received signal to other devices without converting frequency of the received signal to another frequency, according to a second embodiment of the present invention.

A description will now be given of the data-relay apparatus 15 that relays a signal received from the relay station 12 to other devices such as the radio terminal device 13 without converting frequency of the received signal to another frequency, according to a second embodiment of the present invention with reference to FIG. 7.

The data-relay apparatus 15 includes an amplifier 42, a generator 43, a mixer 44, a band-pass filter 45, a splitter 46, a generator 47, a demodulator 48, a frequency-deviation-detecting unit 49, a voltage-controlled oscillator 50, an amplifier 51, a data-receiving antenna 61, amplifier 62, a generator 63, a mixer 64, a band-pass filter 65 and a data-transmitting antenna 66. The generator 47, the demodulator 48, the frequency-deviation-detecting unit 49 and the voltage-controlled oscillator 50 together compose a receiver 53. A unit in FIG. 7 corresponding to a unit in FIG. 4 has the same unit number as the unit in FIG. 4. A combination of the generator 63 and the mixer 64 corresponds to a frequency-conversion unit in the claims.

The data-relay apparatus 15 initially receives a signal having the frequency f3 from the relay station 12 by use of the data-receiving antenna 61, and supplies the received signal to the amplifier 62. The amplifier 62 then amplifies the signal received from the data-receiving antenna 61, and supplies the amplified signal to the mixer 64. The mixer 64 mixes the signal having the frequency f3 and a signal having a frequency fs3 (=fs1) generated by the generator 63, and thus frequency approximately equal to the frequency f2 is obtained. This step is expressed as an equation f3+fs3=f2 (up-convert). The frequency approximately equal to the frequency f2 is referred to as frequency f2'. The band-pass filter then filters the signal having the frequency f2', and supplies the signal to the amplifier 42. The amplifier 42 amplifies the signal supplied thereto, and outputs the amplified signal to the mixer 44. The mixer 44 mixes the signal having the frequency f2' and a signal having the frequency fs1 generated by the generator 43, and supplies the mixed signal having the frequency f3' to the band-pass filter 45, where the mixed signal is filtered. This step is expressed as an equation f2–fs1=f3 (down-convert). The signal having the frequency f3' is then supplied to the amplifier 51, where the signal is amplified, and subsequently the amplified signal is supplied from the amplifier 51 to the data-transmitting antenna 66.

The receiver 53 executes AFC control as described below. The splitter 46 is provided between the band-pass filter 45 and the amplifier 51, supplying the signal from the band-pass filter 45 to the demodulator 48. The demodulator 48 demodulates the signal to a base-band signal by use of a signal generated by the generator 47. The base-band signal demodulated by the demodulator 47 is then supplied to the frequency-deviation-detecting unit 49. Subsequently, the frequency-deviation-detecting unit 49 detects frequency deviation of the base-band signal, and transmits a detection signal notifying of the detected frequency deviation to the voltage-controlled oscillator 50. The frequency fvco generated by the voltage-controlled oscillator 50 is altered according to the detection signal supplied from the frequency-deviation-detecting unit 49.

Each of the generators 43 and 47 outputs a signal with the multiplied frequency as described in the first embodiment. Since the frequency fs2 of the signal generated by the generator 47 is adjusted by the AFC control such that the frequency deviation detected by the frequency-deviationdetecting unit 49 becomes "0", the frequency fs1 of the signal generated by the generator 43 is controlled by the voltage-controlled oscillator 50 such that the frequency of the signal outputted from the mixer becomes close to the frequency f3.

Figure 8:
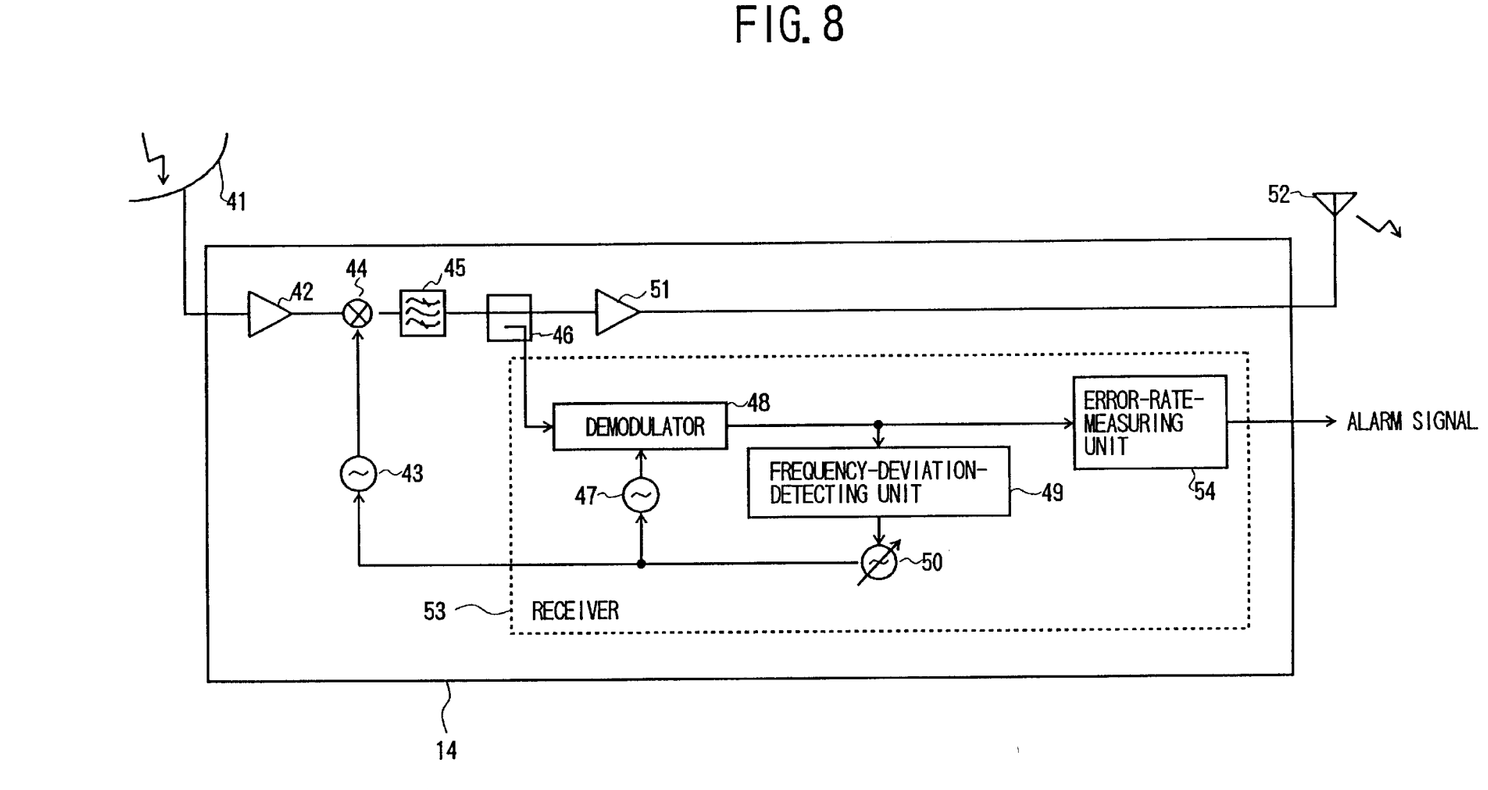
FIG. 8 is the data-relay apparatus 14 according to a third embodiment of the present invention.

A description will now be given of the data-relay apparatus 14 according to a third embodiment of the present invention with reference to FIG. 8.

The data-relay apparatus 14 includes an amplifier 42, a generator 43, a mixer 44, a band-pass filter 45, a splitter 46, a generator 47, a demodulator 48, a frequency-deviation-detecting unit 49, a voltage-controlled oscillator 50, an amplifier 51, a data-receiving antenna 52 and an error-rate-measuring unit 54. A unit in FIG. 8 corresponding to a unit in FIG. 4 has the same unit number as the unit in FIG. 4. The generator 47, the demodulator 48, the frequency-deviation-detecting unit 49, the voltage-controlled oscillator 50 and the error-rate-measuring unit 54 together compose a receiver 53. The error-rate-measuring unit 54 corresponds to an error-monitoring unit in the claims.

The demodulator 48 supplies the base-band signal described in the first embodiment to the frequency-deviation-detecting unit 49 as well as supplying the signal to the error-rate-measuring unit 54. Subsequently, the error-rate-measuring unit 54 calculates error rate of communication or broadcasting information obtained from the base-band signal by use of an error-correcting sign attached to the communication or broadcasting information. If the error rate exceeds a predetermined value, the error-rate-measuring unit 54 determines that an error has occurred in the data-relay apparatus 14 or in an input signal to the data-relay apparatus 14, and may output an alarm signal to a monitoring device that monitors condition of the data-relay apparatus 14. This error-rate-measuring unit 54 may be provided similarly in the receiver 53 of the data-relay apparatus 15 according to the second embodiment of the present invention.

According to the present invention as described above, the frequency deviation of a signal outputted from each of the data-relay apparatuses 14 and 15 decreases compared to that of an input signal thereto. Accordingly, the radio terminal device 13 shown in FIG. 1 can receive a clear signal from the data-relay apparatuses 14 and 15, and thus does not need to execute either a frequency search or AFC control for detecting frequency deviation of the received signal. As a result, the size of the radio terminal device 13 can be minimized. Additionally, each of the data-relay apparatuses 14 and 15 supplies a signal from its output signal to the receiver thereof so that the device can also detect any error occurred in the output signal.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-056465, filed on Mar. 1, 2000, the entire contents of which are hereby incorporated by reference.

What is claimed is:

1. A method of stabilizing frequency of an output signal of a data-relay apparatus provided in a radio communication system that includes a relay station and a radio terminal device, wherein the data-relay apparatus receives a signal as an input signal from the relay station, and transmits the signal as an output signal to the radio terminal device, said method comprising the steps of:

demodulating the output signal by use of a first signal to generate a demodulated signal;

detecting frequency deviation of the output signal from the demodulated signal;

generating the first signal according to the frequency deviation of the output signal; and     generating a second signal to mix with the input signal to generate the output signal, the generation of the first signal and the second signal being carried out such that the detected frequency deviation of the output signal becomes substantially zero.

2. The method as claimed in claim 1, further comprising the steps of:

mixing the second signal with the input signal having first frequency received from the relay station to generate a signal having second frequency; and     transmitting the signal having the second frequency as the output signal.

3. The method as claimed in claim 1, comprising the steps of:

converting the input signal having first frequency received from the relay station to an intermediate signal having second frequency;

mixing the second signal with the intermediate signal having the second frequency to generate the output signal having the first frequency; and     transmitting the output signal having the first frequency.

4. The data-relay apparatus as claimed in claim 1, wherein said radio communication system includes a broadcasting system.

5. The data-relay apparatus as claimed in claim 1, wherein said relay station includes a satellite.

6. A data-relay apparatus in a radio communication system that includes a relay station and a radio terminal device, wherein said data-relay apparatus receives a signal as an input signal from the relay station and transmits the signal as an output signal to the radio terminal device, comprising;

a voltage-controlled oscillator generating a signal according to control voltage supplied thereto;

a demodulation unit demodulating the output signal to generate a demodulated signal by use of a second signal;

a control unit detecting frequency deviation of the output signal from the demodulated signal, and supplies the control voltage corresponding to the frequency deviation of the output signal to said voltage-controlled oscillator;

a first frequency-multiplication unit generating a first signal by multiplying frequency of the signal generated by said voltage-controlled oscillator, to mix the first signal with the input signal to generate the output signal, the generation of the first signal and the second signal being carried out such that the detected frequency deviation of the output signal becomes substantially zero; and     a second frequency-multiplication unit generating the second signal by multiplying the frequency of the signal generated by said voltage-controlled oscillator, and supplying the second signal to said demodulation unit.

7. The data-relay apparatus as claimed in claim 6, further comprising a mixer converting the input signal having first frequency received from the relay station to the output signal having second frequency by use of the first signal generated by said first frequency-multiplication unit.

8. The data-relay apparatus as claimed in claim 6, further comprising:

a frequency-conversion unit converting the input signal having first frequency received from the relay station to an intermediate signal having second frequency; and a mixer converting the intermediate signal having the second frequency received from said frequency-conversion unit to the output signal having the first frequency by use of the first signal generated by said first frequency-multiplication unit.

9. The data-relay apparatus as claimed in claim 6, further comprising an error-monitoring unit monitoring demodulation of the output signal, and outputting an alarm signal when detecting an error in the demodulated signal.

10. The data-relay apparatus as claimed in claim 6, wherein said radio communication system includes a broadcasting system.

11. The data-relay apparatus as claimed in claim 6, wherein said relay station includes a satellite.

12. The data-relay apparatus as claimed in claim 6, wherein said control unit includes an automatic frequency control (AFC) circuit therein.

13. A data-relay apparatus that receives a signal of a first frequency from a satellite and carries out frequency-conversion to the received signal using a first signal to transmit a frequency-converted signal of a second frequency which is different from the first frequency, the data-relay apparatus comprising:

a voltage-controlled oscillator;

a frequency-multiplication unit that multiplies an output of the voltage-controlled oscillator and outputs a multiplication result as the first signal;

a demodulation unit that demodulates said frequency-converted signal using the output of the voltage-controlled oscillator to produce a demodulated signal; and a controller that applies a control voltage to the voltage-controlled oscillator in accordance with a frequency deviation of the modulated signal.

14. A data-relay apparatus that receives a signal of a prescribed frequency from a satellite and retransmits the signal of the prescribed frequency, comprising:

a first frequency-conversion unit that carries out frequency-conversion to the received signal to produce a first frequency-converted signal;

a voltage-controlled oscillator;

a second frequency-conversion unit that carries out frequency conversion to the first frequency-converted signal using a signal obtained by multiplying an output signal from the voltage-controlled oscillator to produce a second frequency-converted signal;

a demodulator that demodulates the second frequency-converted signal using said output signal from the voltage-controlled oscillator to produce a demodulated signal; and a controller that applies a control voltage to the voltage-controlled oscillator in accordance with a frequency deviation of the demodulated signal.

* * * * *